(12) United States Patent
Canales Delgado (10) Patent No.: US 12,036,906 B2
(45) Date of Patent: Jul. 16, 2024

(54) BABY CHANGING TABLE ASSEMBLY FOR A VEHICLE

(71) Applicant: NISSAN NORTH AMERICA, INC., Franklin, TN (US)

(72) Inventor: Brian Canales Delgado, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 70 days.

(21) Appl. No.: 17/709,226

(22) Filed: Mar. 30, 2022

(65) Prior Publication Data

US 2023/0311735 A1 Oct. 5, 2023

(51) Int. Cl.
*B60N 3/00* (2006.01)
*A47D 5/00* (2006.01)

(52) U.S. Cl.
CPC ............ *B60N 3/001* (2013.01); *A47D 5/006* (2013.01)

(58) Field of Classification Search
CPC .... B60N 3/001; B60N 3/004; B64D 11/0638; A47D 5/006; A47C 7/70; A47C 7/705; A47C 7/68
USPC ............................ 108/44; 297/146, 147, 153
See application file for complete search history.

(56) References Cited

U.S. PATENT DOCUMENTS

| | | | |
|---|---|---|---|
| 1,925,607 A | 9/1933 | Rottmer | |
| 2,687,336 A * | 8/1954 | Smith | B60N 3/004 108/34 |
| 2,921,824 A * | 1/1960 | Richter | B60N 3/004 108/134 |
| 3,037,216 A | 6/1962 | Carrier | |
| D272,402 S | 1/1984 | Marrujo | |
| 5,046,433 A * | 9/1991 | Kramer | B60N 3/004 297/188.06 |
| 5,678,741 A * | 10/1997 | Schieber | B60N 3/004 D12/416 |
| 5,813,354 A * | 9/1998 | Scott | B60N 3/004 297/146 |
| 6,055,688 A | 5/2000 | Helmsderfer et al. | |
| 6,327,726 B1 | 12/2001 | Weber | |
| 6,502,900 B1 * | 1/2003 | Johnston | B60N 2/879 297/188.05 |
| 6,588,821 B2 | 7/2003 | Worrell et al. | |
| 6,679,188 B1 * | 1/2004 | Spagnoli, Jr. | B60N 3/004 108/44 |
| 7,658,153 B1 * | 2/2010 | Patoka | B60R 11/00 108/46 |
| D620,724 S | 8/2010 | Presnell | |
| 7,810,880 B2 * | 10/2010 | Spellman | B60N 2/809 297/188.06 |

(Continued)

FOREIGN PATENT DOCUMENTS

WO 2020/055469 A1 3/2020

*Primary Examiner* — Jose V Chen
(74) *Attorney, Agent, or Firm* — Global IP Counselors, LLP (57) ABSTRACT

A baby changing table assembly for a vehicle includes a support, a connecting member connected to the support, first and second brackets connected to the connecting member, and a table movably connected to the support. The first bracket is configured to be connected to a first headrest of the vehicle and the second bracket is configured to be connected to a second headrest of the vehicle. The table is movable between a closed position and an open position.

18 Claims, 6 Drawing Sheets

(56) References Cited

U.S. PATENT DOCUMENTS

| | | |
|---|---|---|
| 7,832,037 B2 | 11/2010 | Overton |
| 9,120,398 B2 | 9/2015 | Iskowitz |
| 10,160,363 B2 | 12/2018 | Aguilar |
| 10,716,410 B2 | 7/2020 | Iizumi |
| 11,051,633 B1 | 7/2021 | Perez |
| 2003/0038514 A1* | 2/2003 | Johnston .................. B60N 2/20 297/188.04 |
| 2003/0150892 A1* | 8/2003 | Hoe ........................ B60R 7/043 224/275 |
| 2006/0144884 A1* | 7/2006 | Abbate .................... A45C 9/00 224/580 |
| 2017/0303701 A1* | 10/2017 | Degon .................... A47D 5/006 |
| 2018/0008054 A1 | 1/2018 | Vargas et al. |

* cited by examiner

BABY CHANGING TABLE ASSEMBLY FOR A VEHICLE

BACKGROUND

Technical Field

The present disclosure generally relates to a baby changing table assembly for a vehicle. More specifically, the present disclosure relates to a baby changing table assembly that is configured to connect to a headrest support of a vehicle.

Background Information

A baby traveling in a vehicle often requires a diaper change. A public restroom might not be readily available, or, if available, undesirable due to unsanitary conditions. Additionally, a public restroom frequently lacks a baby changing table. A public restroom does not provide a reliable and easy location for a diaper to be changed.

A changing pad can be positioned on a rear seat of the vehicle to allow a diaper to be changed in the vehicle. The rear seat of the vehicle provides limited space, such that using the changing pad to change a diaper is difficult. Additionally, the position of the changing pad on the rear seat requires that the diaper be changed from an awkward position.

SUMMARY

A need exists for a baby changing table assembly for a vehicle.

In view of the state of the known technology, one aspect of the present disclosure is to provide a baby changing table assembly for a vehicle includes a support, a connecting member connected to the support, first and second brackets connected to the connecting member, and a table movably connected to the support. The first bracket is configured to be connected to a first headrest of the vehicle and the second bracket is configured to be connected to a second headrest of the vehicle. The table is movable between a closed position and an open position.

Another aspect of the present disclosure is to provide a baby changing table assembly for a vehicle. A first headrest is connected to a first seat. A second headrest is connected to a second seat. The second seat is disposed adjacent the first seat. A connecting member is connected to a support. First and second brackets are connected to the connecting member. The first bracket is configured to be connected to the first headrest and the second bracket is configured to be connected to the second headrest. The support is disposed between the first and second headrests in a lateral direction of the vehicle. A table is movably connected to the support. The table is movable between a closed position and an open position.

Also other objects, features, aspects and advantages of the disclosed hinge assembly for a baby changing table assembly for a vehicle will become apparent to those skilled in the art from the following detailed description, which, taken in conjunction with the annexed drawings, discloses exemplary embodiments of the baby changing table assembly for a vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 3:
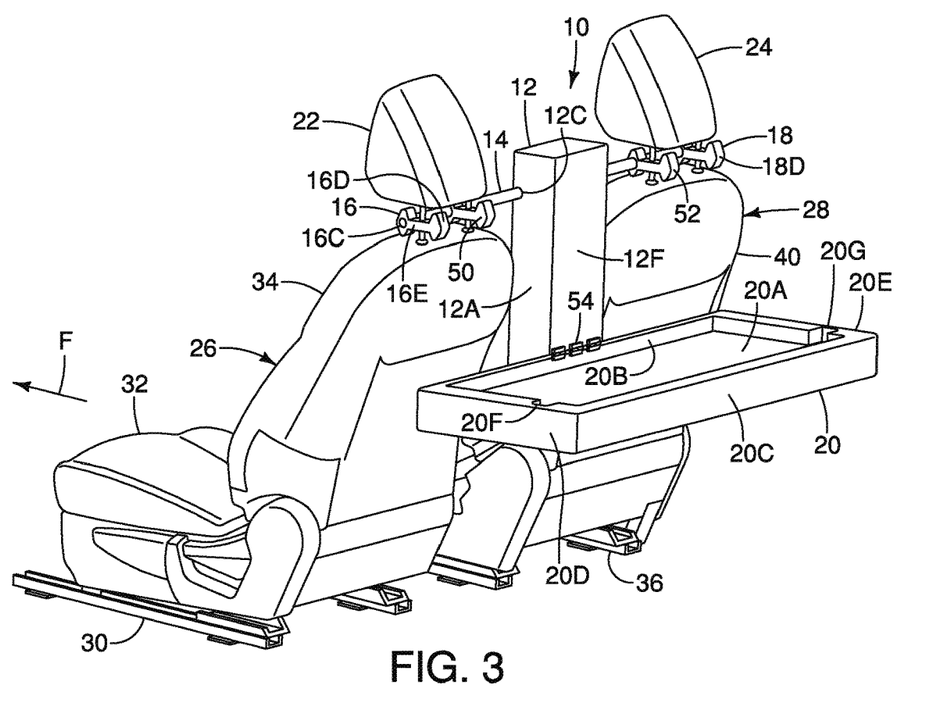
FIG. 3 is a rear drive side perspective view of the baby changing table assembly of FIG. 1.
Figure 4:
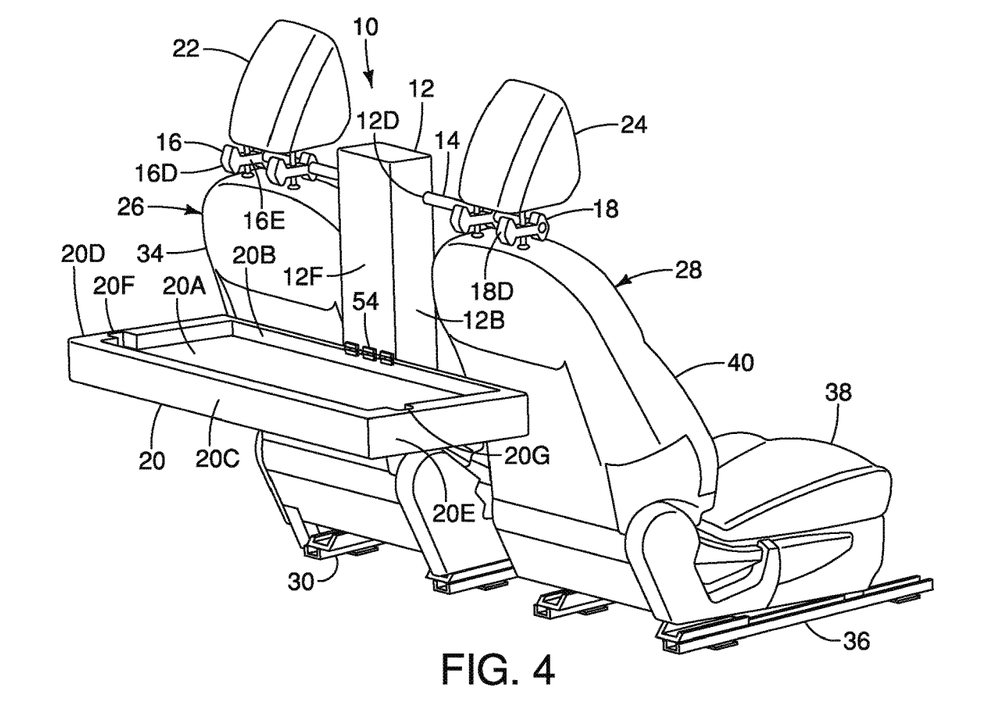
FIG. 4 is a rear passenger side perspective view of the baby changing table assembly of FIG. 1.
Figure 5:
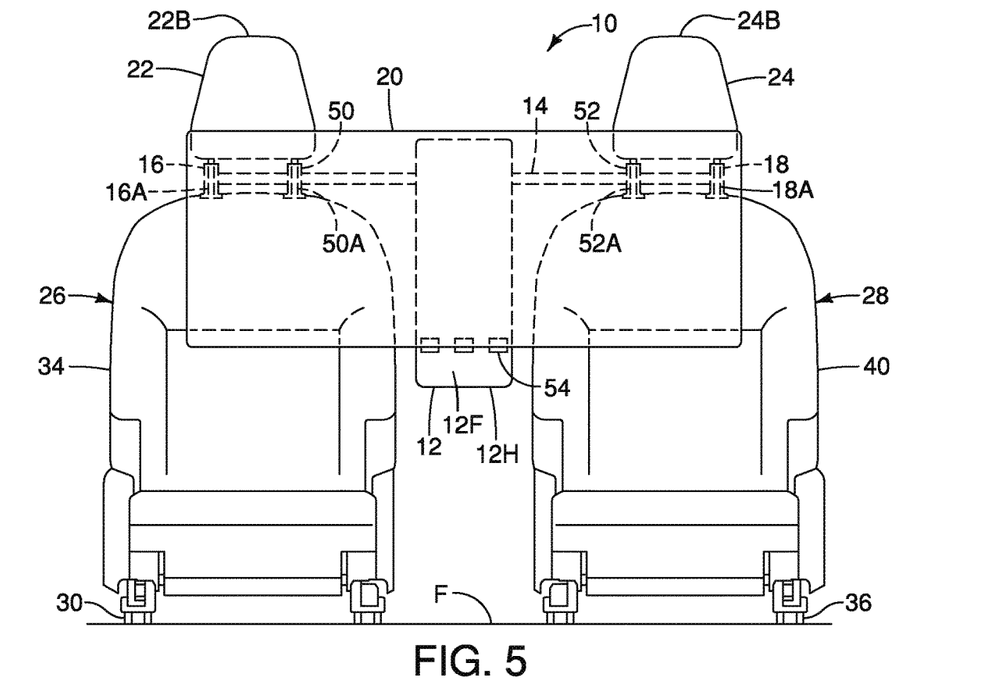
FIG. 5 is a rear elevational view of the baby changing table assembly of FIG. 1 in which the table is moved to a closed position.

Referring initially to FIGS. 1-5, a baby changing table assembly 10 for a vehicle is illustrated in accordance with an exemplary embodiment. The baby changing table assembly 10 includes a support 12, a connecting member 14 connected to the support 12, first and second brackets 16 and 18 connected to the connecting member 14, and a table 20 movably connected to the support 12. The first bracket 16 is configured to be connected to a first headrest 22 of the vehicle. The second bracket 18 is configured to be connected to a second headrest 24 of the vehicle. The table 20 is movable between a closed position, as shown in FIG. 5, and an open position, as shown in FIGS. 1-4.

The vehicle includes a first seat 26 and a second seat 28, as shown in FIGS. 1-5. The first vehicle seat 26 includes a first base 30, a first lower seat portion 32, a first seatback 34 and the first headrest 22. The first base 30 is preferably fixed to a floor F within a passenger compartment of the vehicle. The first base 30 is illustrated as including two rails, although the base can have any suitable number of rails or any suitable mounting structure to connect to the floor F. The first base 30, the first lower seat portion 32, the first seatback 34 and the first headrest 22 are connected to one another in a conventional manner.

The second vehicle seat 28 is similarly configured and includes a second base 36, a second lower seat portion 38, a second seatback 40 and the second headrest 24. The second base 36 is preferably fixed to the floor F within the passenger compartment of the vehicle. The second base 36 is illustrated as including two rails, although the base can have any suitable number of rails or any suitable mounting structure to connect to the floor F. The second base 36, the second lower seat portion 38, the second seatback 40 and the second headrest 24 are connected to one another in a conventional manner.

The vehicle can be any vehicle in which the vehicle seat can be disposed, such that the vehicle, the vehicle floor, and the passenger compartment are not discussed or illustrated herein. Additionally, conventional parts of the vehicle seat are not discussed or illustrated in detail herein.

The first headrest 22 is connected to the first seat 26 by at least one headrest support, or stay, 42, as shown in FIGS. 1-5. The first headrest 22 is shown having first and second headrest supports 42 and 44 to connect the first headrest 22 to the first seatback 34 of the first seat 26. The first seatback 34 preferably includes adjustment mechanisms 34A and 34B that allows each of the headrest supports 42 and 44 to be moved relative to the first seatback 34 to control a distance between a lower end 22A of the first headrest 22 and an upper end 34C of the first seatback 34. The adjustment mechanisms 34A and 34B can lock each of the headrest supports 42 and 44 at a desired position.

The second headrest 24 is connected to the second seat 28 by at least one headrest support, or stay, 46, as shown in FIGS. 1-5. The second headrest 24 is shown having first and second headrest supports 46 and 48 to connect the second headrest 24 to the second seatback 40 of the second seat 28. The second seatback 40 preferably includes adjustment mechanisms 40A and 40B that allows each of the headrest supports 46 and 48 to be moved relative to the second seatback 40 to control a distance between a lower end 24A of the second headrest 24 and an upper end 40C of the second seatback 40. The adjustment mechanisms 40A and 40B can lock each of the headrest supports 46 and 48 at a desired position.

Figure 1:
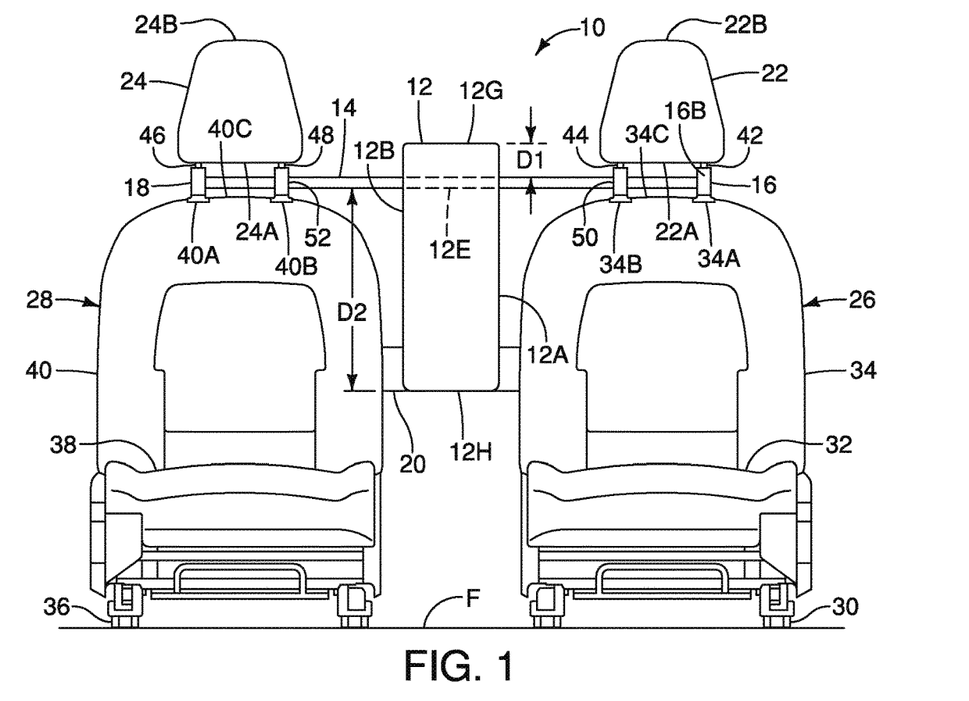
FIG. 1 is a front elevational view of a baby changing table assembly in accordance with an exemplary embodiment.
Figure 2:
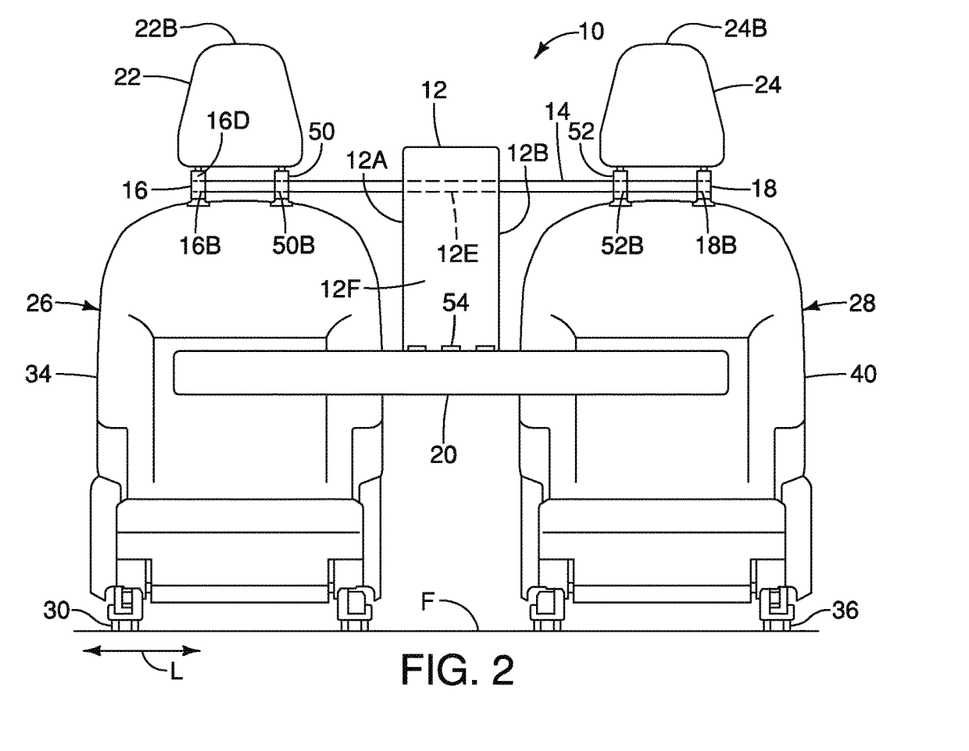
FIG. 2 is a rear elevational view of the baby changing table assembly of FIG. 1.

The first bracket 16 is connected to the first headrest 22. The first bracket 16 includes a first opening 16A extending through the first bracket 16 configured to receive the first headrest support 42, as shown in FIGS. 1 and 5. A third bracket 50 includes a first opening 50A extending through the third bracket 50 configured to receive the second headrest support 44 of the first headrest 22. Each of the first and third brackets 16 and 50 includes a second opening 16B and 50B, respectively, configured to receive the connecting member 14, as shown in FIG. 2.

The second bracket 18 is connected to the second headrest 24. The second bracket 18 includes a first opening 18A extending through the second bracket 18 configured to receive the first headrest support 46, as shown in FIGS. 1 and 5. A fourth bracket 52 includes a first opening 52A extending through the fourth bracket 52 configured to receive the second headrest support 48 of the second headrest 24. Each of the second and fourth brackets 18 and 52 includes a second opening 18B and 52B, respectively, configured to receive the connecting member 14, as shown in FIG. 2.

The first bracket 16 includes a forward portion 16C and a rearward portion 16D connected by a connecting portion 16E, as shown in FIGS. 1-5. The forward portion 16C and the rearward portion 16D have a thickness greater than a thickness of the connecting portion 16E. A width of the first bracket 16 is substantially constant. The first opening 16A of the first bracket 16 that receives the connecting member 14 is disposed in the forward portion 16C. The second opening 16B of the first bracket 16 that receives the headrest support 42 is disposed in the connecting portion 16E. The second, third and fourth brackets 18, 50 and 52 are configured substantially similarly to the first bracket 16. The brackets 16, 18, 50 and 52 are preferably made of a metallic material, such as steel, although any suitable material can be used.

The connecting member 14 is configured to be received by the first and second brackets 16 and 18, as shown in FIGS. 1-5. The connecting member 14 is preferably received by the first, second, third and fourth brackets 16, 18, 50 and 52. The connecting member 14 is illustrated as being a circular rod or tube, but can have any suitable configuration. The connecting member 14 is preferably made of a metallic material, such as steel, although any suitable material can be used.

The support 12 is configured to be connected to the connecting member 14, as shown in FIGS. 1-5. The support 12 is preferably substantially hollow. The support 12 has a first side surface 12A and a second side surface 12B substantially parallel to the first side surface 12A. A first opening 12C is disposed in the first side surface and a second opening 12D is disposed in the second side surface 12B, as shown in FIGS. 3 and 4. A passage 12E connects the first and second openings 12C and 12D. The passage 12E is configured to receive the connecting member 14, as shown in FIG. 1. A rear surface 12F extends between rearward ends of the first and second side surfaces 12A and 12B. The rear surface 12F is substantially perpendicular to the first and second side surfaces 12A and 12B. The support 12 is preferably made of a plastic material, such as polyurethane, although any suitable material can be used.

The table 20 is configured to be movably connected to the support 12, as shown in FIGS. 1-5. The table 20 preferably has a substantially rectangular shape, although the table can have any suitable shape. The table 20 has a base 20A and a plurality of walls 20B-20E extending upwardly therefrom. First and second walls 20B and 20C are oppositely disposed and extend in a lateral direction of the vehicle. Third and fourth walls 20D and 20E are oppositely disposed and extend in a longitudinal direction of the vehicle. The table 20 is preferably made of a plastic material, such as polyurethane, although any suitable material can be used.

A first notch 20F is disposed in the third wall 20D and a second notch 20G is disposed in the fourth wall 20E of the table 20, as shown in FIGS. 3 and 4. The first notch 20F is configured to receive the rearward portion 16D of the first bracket 16 when the table 20 is in the closed position, as shown in FIG. 5. The second notch 20G is configured to receive a rearward portion 18D of the second bracket 18 when the table 20 is in the closed position. A friction, or interference fit, is formed between each of the respective notches and brackets to facilitate maintaining the table 20 in the closed position. Alternatively, any suitable mating configuration can be used between the brackets and the table to facilitate maintaining the table in the closed position.

A plurality of hinge members 54 movably connect the first wall 20B of the table 20 and the rear surface 12F of the support 12, as shown in FIGS. 2-5. The plurality of hinge members 54 provide movement of the table 20 between the closed position, as shown in FIG. 5, and the open position, as shown in FIGS. 1-4. Although shown with three hinge members, any suitable number of hinge members can be used to provide movement of the table 20 between closed and open positions.

To assemble the baby changing table assembly 10, as shown in FIGS. 1-5, the connecting member 14 is passed through the first openings in the first to fourth brackets 16, 18, 50 and 52, respectively. An interference fit is formed between each of the first to fourth brackets 16, 18, 50 and 52 and the connecting member 14. The interference fit allows each of the brackets 16, 18, 50 and 52 to be movably connected to the connecting member 14. Each of the brackets 16, 18, 50 and 52 is movable to a position to receive a headrest support of the first and second headrests 22 and 24, such that the brackets of the changing table assembly 10 can accommodate variously configured vehicle seats and headrests. As, shown in FIGS. 1-5, the first bracket 16 receives the first headrest support 42 of the first headrest 22, the second bracket 18 receives the first headrest support 46 of the second headrest 24, the third bracket 50 receives the second headrest support 44 of the first headrest 22, and the fourth bracket 52 receives the second headrest support 48 of the second headrest 24. Each of the brackets 16, 18, 50 and 52 can be moved to a position on the connecting member 14 to accommodate the spacing between each of the headrest supports and the headrests. The connecting member 14 is preferably disposed forward of the headrest supports 42, 44, 46 and 48 in a forward direction F of the vehicle, as shown in FIG. 3. A setscrew (not shown) can be movably disposed in each of the brackets 16, 18, 50 and 52 to engage the respective headrest supports 42, 44, 46 and 48 to securely maintain the position of each of the headrests.

The support member 12 can be movably disposed on the connecting member 14 to facilitate disassembling and storing the baby changing table assembly 10 when not in use. Alternatively, the support member 12 can be rigidly fixed to the connecting member 14.

The plurality of hinge members 54 movably connect the table 20 to the support member 12, as shown in FIGS. 1-5. The table 20 is movably between the closed position (FIG. 5) and the open position (FIGS. 1-4).

A first distance D1 between the connecting member 14 to an upper surface 12G, or the uppermost end, of the support 12 is less than a second distance D2 between the connecting member 14 and a lower surface 12H, or the lowermost end, of the support 12, as shown in FIG. 1. The first distance D1 and the second distance D2 are substantially perpendicular to the connecting member 14.

As shown in FIGS. 1-5, the support 12 is disposed between the first and second brackets 16 and 18 in a lateral direction L of the vehicle. The first and third brackets 16 and 50 are disposed on a first side of the support 12, and the second and fourth brackets 18 and 52 are disposed on a second side of the support 12 opposite the first side. The support 12 is disposed between the first and second headrests 22 and 24 in the lateral direction L of the vehicle. An uppermost end, or the upper surface 12G, of the support 12 is disposed lower than uppermost ends 22B and 24B of each of the first and second headrests 22 and 24, respectively. The uppermost end, or the upper surface 12G, of the support 12 is disposed higher than lowermost ends 22A and 24A of each of the first and second headrests 22 and 24, respectively.

Figure 6:
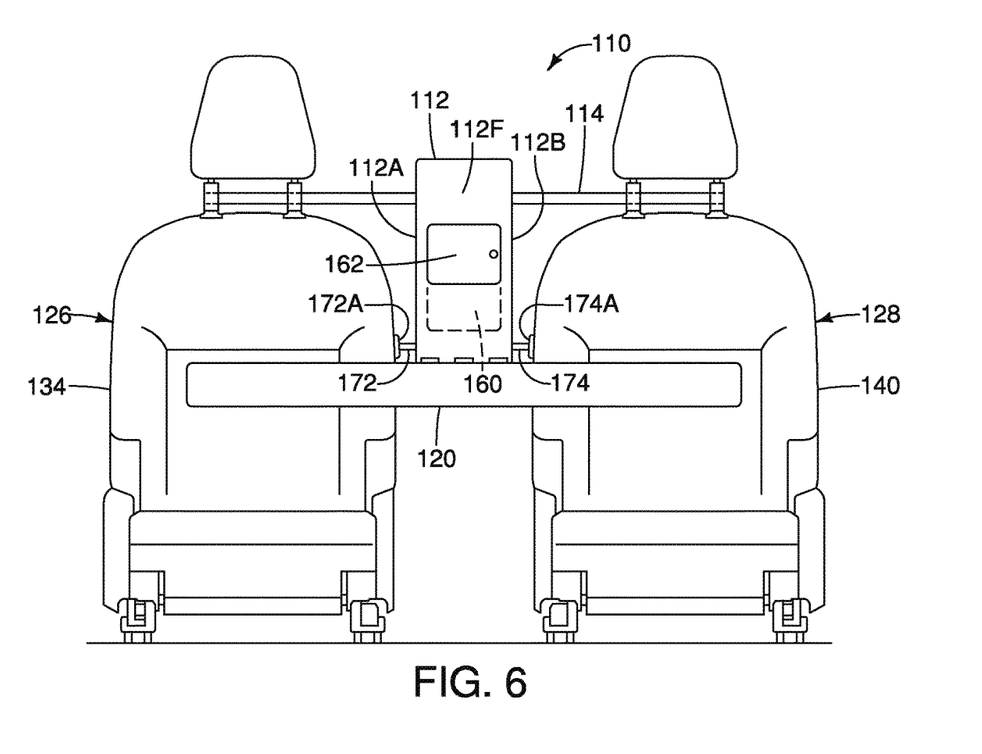
FIG. 6 is a rear elevational view of the baby changing table assembly in accordance with another exemplary embodiment including a storage compartment.

Another exemplary embodiment of the baby changing table assembly 110 is shown in FIG. 6. The features of the baby changing table assembly 110 of FIG. 6 that are substantially similar to the features of the baby changing table assembly 10 of FIGS. 1-5 are provided the same reference numerals as the features of the baby changing table assembly 10 except in the 100 series (i.e., 1xx). Moreover, the descriptions of the parts of the baby changing table assembly 110 of FIG. 6 that are identical to the baby changing table assembly 10 of FIGS. 1-5 are omitted for the sake of brevity.

The support 112 includes a storage compartment 160 accessible through a door 162 in the rear surface 112F of the support 112, as shown in FIG. 6. Supplies can be stored in the storage compartment 160.

The support 112 of the baby changing table assembly 110 includes first and second support arms 172 and 174, as shown in FIG. 6. The first arm 172 extends between the first side surface 112A of the support 112 and the seatback 134 of the first seat 126. The second arm 174 extends between the second side surface 112B of the support 112 and the second seatback 140 of the second seat 128. The first and second support arms 172 and 174 are disposed between the table 120 and the connecting member 114. The first and second support arms 172 and 174 further support the baby changing table assembly 110.

The first support arm 172 includes a first support member 172A that engages the first seatback 134 of the first seat 126. The second support arm 174 includes a second support member 174A that engages the second seatback 140 of the second seat 128. The first and second support members 172A and 174A are preferably pivotably connected to the first and second support arms 172 and 174 to facilitate engaging the contours of the first and second seatbacks 134 and 140. The first and second support arms 172 and 174 are preferably pivotably connected to the first and second side surfaces 112A and 112B of the support to further facilitate engaging the first and second support arms 172 and 174 with the first and second seatbacks 134 and 140, respectively, and to facilitate collapsing the first and second support arms 172 and 174 for storage.

Figure 7:
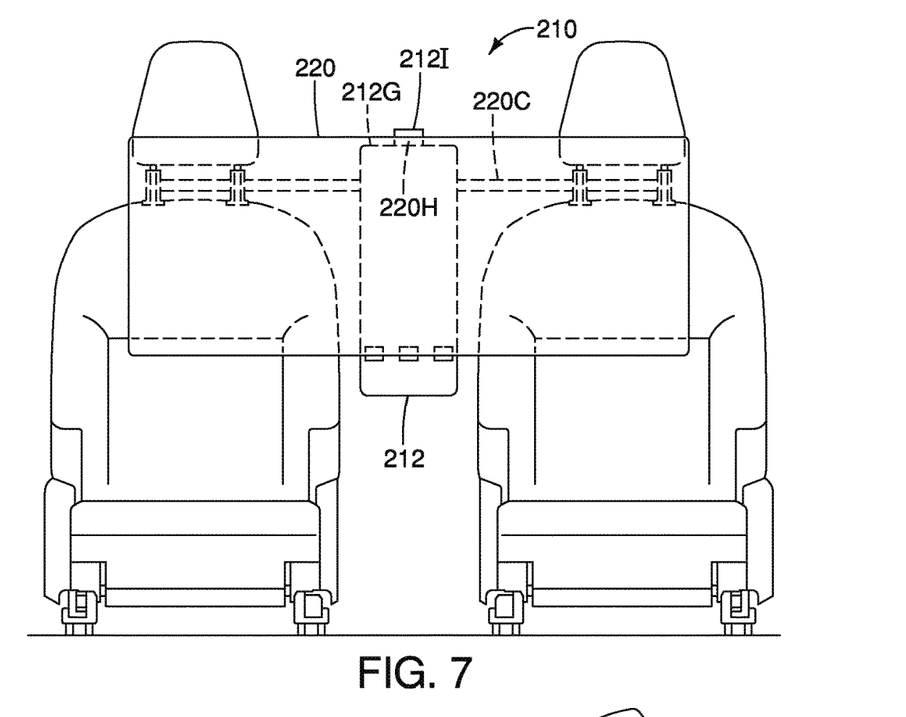
FIG. 7 is a rear elevational view of the baby changing table assembly of FIG. 5 including a tab to facilitate retaining the table in a closed position.

Another exemplary embodiment of the baby changing table assembly 210 is shown in FIG. 7. The features of the baby changing table assembly 210 of FIG. 7 that are substantially similar to the features of the baby changing table assembly 10 of FIGS. 1-5 are provided the same reference numerals as the features of the baby changing table assembly 10 except in the 200 series (i.e., 2xx). Moreover, the descriptions of the parts of the baby changing table assembly 210 of FIG. 7 that are identical to the baby changing table assembly 10 of FIGS. 1-5 are omitted for the sake of brevity.

The wall 220C of the table 220 includes a notch 220H, as shown in FIG. 7. The upper surface 212G of the support 212 includes a tab 212I. The notch 220H of the table 220 receives the tab 212I of the support 212 when the table 220 is in the closed position to facilitate retaining the table 220 in the closed position. Alternatively, the wall 220C of the table 220 can include the tab, and the upper surface 212G of the support 212 can include the notch.

Figure 8:
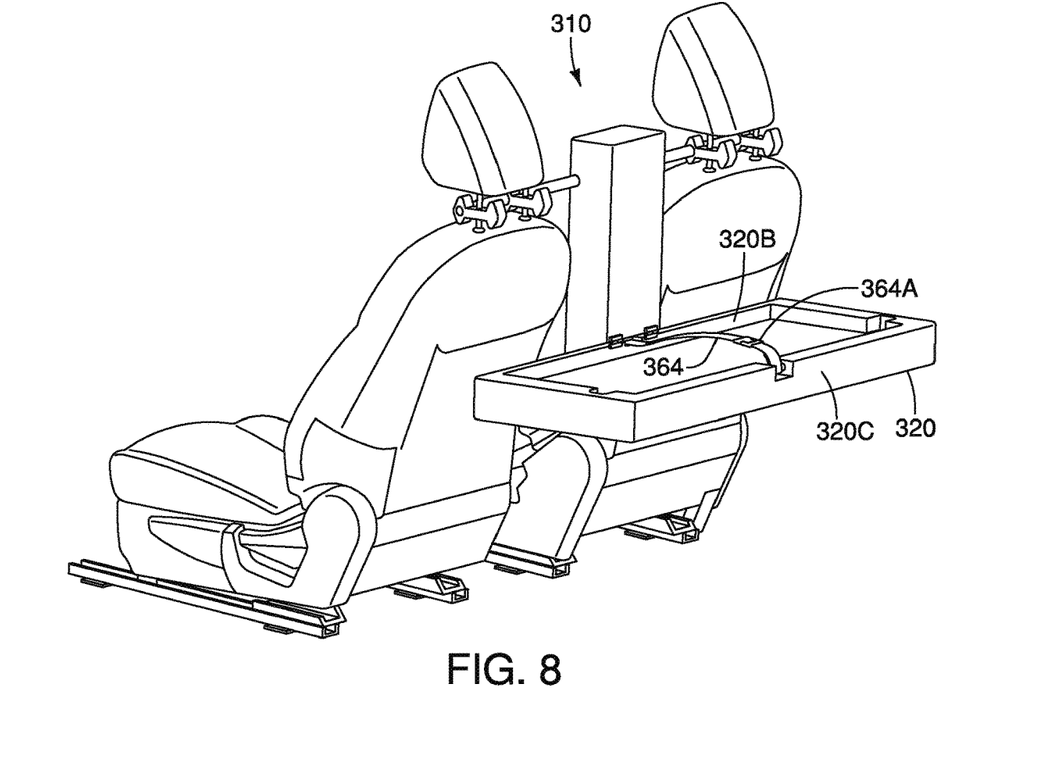
FIG. 8 is a rear perspective view of the baby changing table assembly of FIG. 3 in which the table includes a belt.

Another exemplary embodiment of the baby changing table assembly 310 is shown in FIG. 8. The features of the baby changing table assembly 310 of FIG. 8 that are substantially similar to the features of the baby changing table assembly 10 of FIGS. 1-5 are provided the same reference numerals as the features of the baby changing table assembly 10 except in the 300 series (i.e., 3xx). Moreover, the descriptions of the parts of the baby changing table assembly 310 of FIG. 8 that are identical to the baby changing table assembly 10 of FIGS. 1-5 are omitted for the sake of brevity.

A strap 364, as shown in FIG. 8, is connected to the table 320 to securely retain a baby thereto. A first portion of the strap 364 is connected to the first wall 320B of the table 320 and a second portion of the strap 364 is connected to the second wall 320C. The portions of the strap 364 can be connected to the first and second walls 320B and 320C in any suitable manner. The strap 364 includes a buckle 364A to facilitate adjusting a tightness of the strap 364 and opening and closing of the strap 364.

Figure 9:
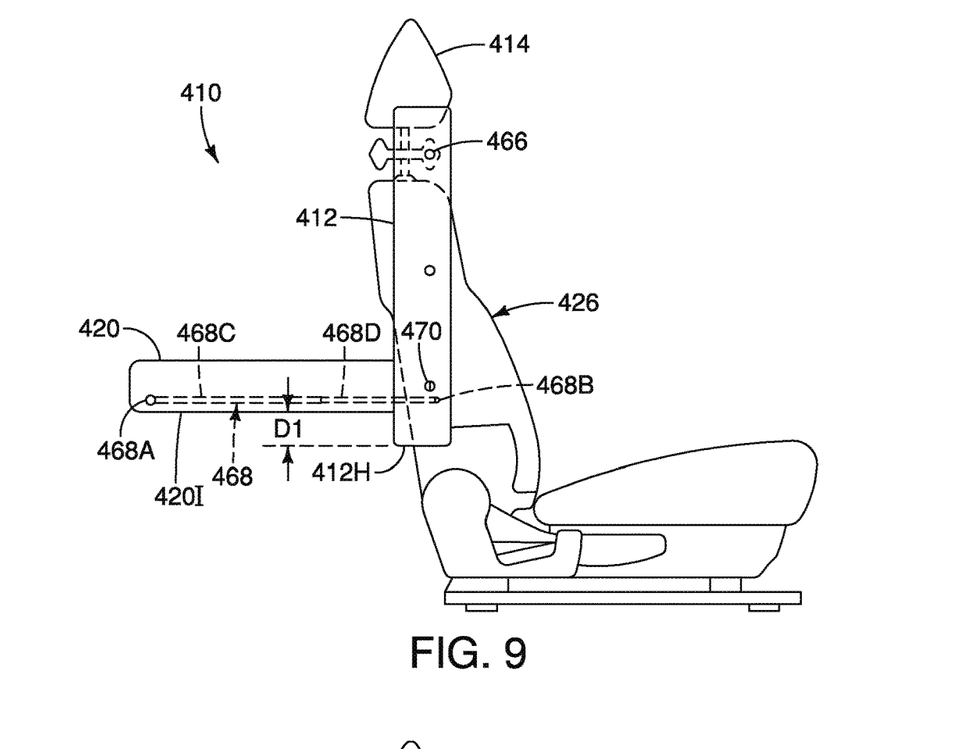
FIG. 9 is a side elevational view of a baby changing table assembly in accordance with another exemplary embodiment in which a table height is adjustable and the table is illustrated in a first position.
Figure 10:
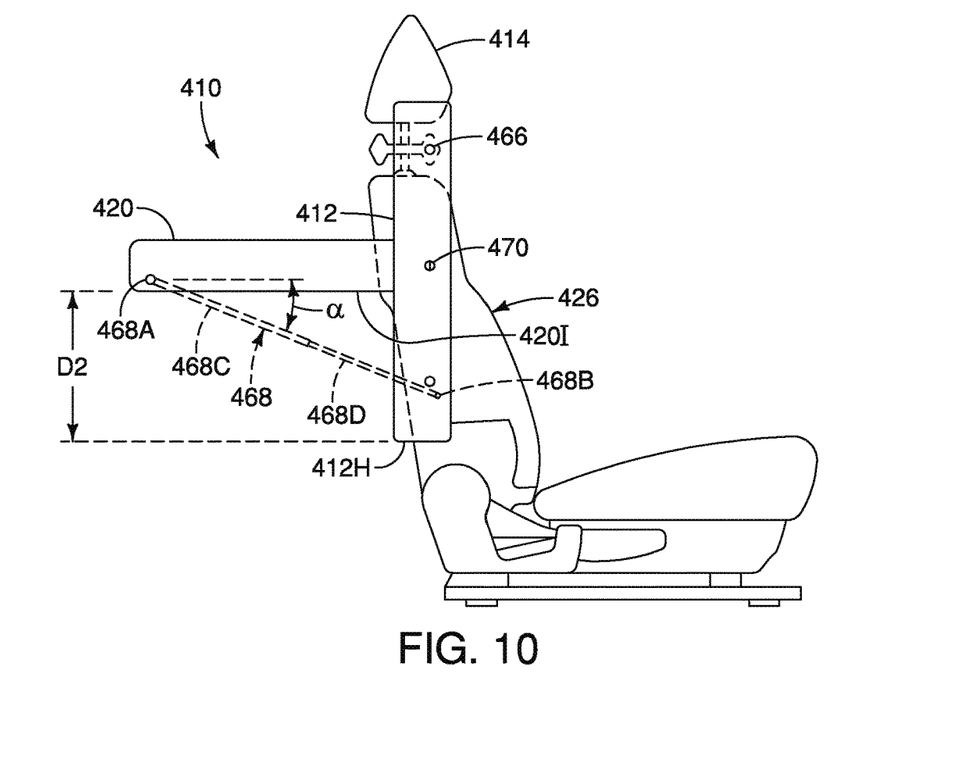
FIG. 10 is a side elevational view of the baby changing table assembly of FIG. 9 in which the table is moved to a second position.
Figure 11:
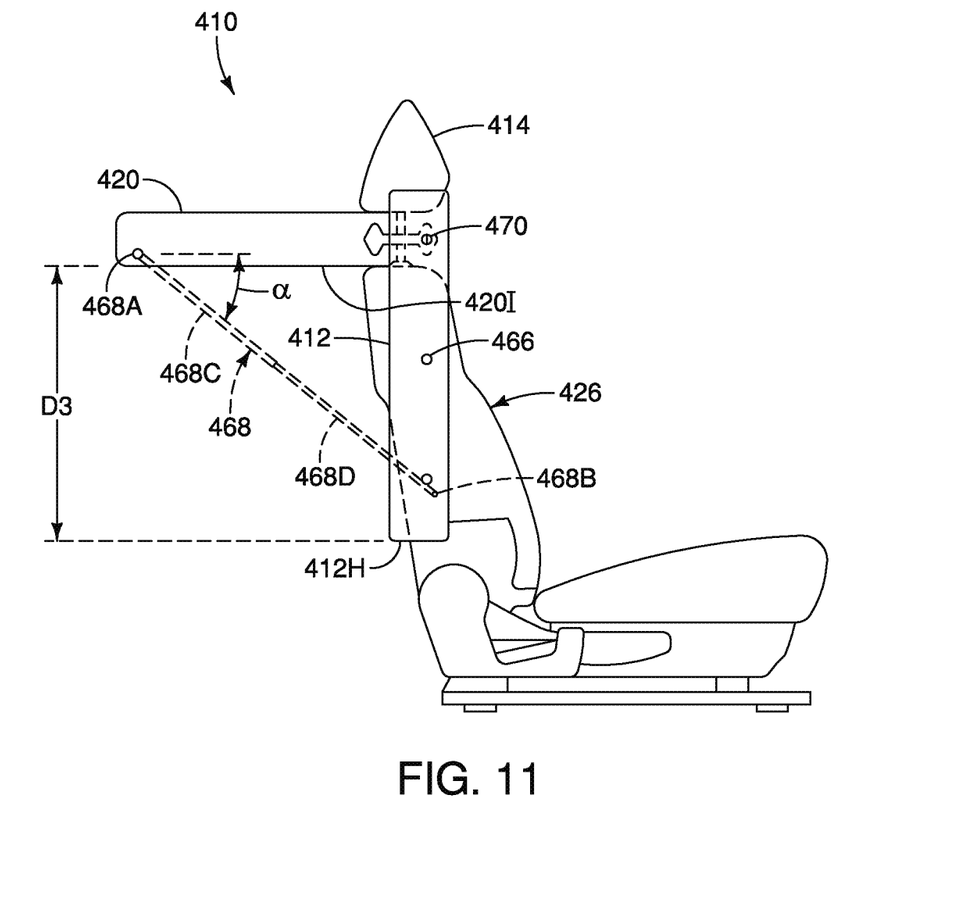
FIG. 11 is a side elevational view of the baby changing table assembly of FIG. 9 in which the table is moved to a third position.

Another exemplary embodiment of the baby changing table assembly 410 is shown in FIGS. 9-11. The features of the baby changing table assembly 410 of FIGS. 9-11 that are substantially similar to the features of the baby changing table assembly 10 of FIGS. 1-5 are provided the same reference numerals as the features of the baby changing table assembly 10 except in the 400 series (i.e., 4xx). Moreover, the descriptions of the parts of the baby changing table assembly 410 of FIGS. 9-11 that are identical to the baby changing table assembly 10 of FIGS. 1-5 are omitted for the sake of brevity.

The support 412 of the baby changing table assembly 410 includes a plurality of fastener openings 466 vertically spaced from one another, as shown in FIGS. 9-11. The support 412 is shown having three fastener openings 466, although the support can have any suitable number of fastener openings 466. The table 420 is connected to the support 412 between the headrest 414 of the first seat 426 and the headrest of the second seat, similarly to the table 20 in FIGS. 1-5.

A hinge arm 468 extends between the table 420 and the support 412. A first end 468A of the hinge arm 468 is connected to the table 420. A second end 468B of the hinge arm 468 is connected to the support 412. The hinge arm 468 preferably includes a first portion 468C and a second portion 468D. One of the first and second portions 468C and 468D telescopes with respect to the other of the first and second portions 468C and 468D such that a length of the hinge arm 468 between the first and second ends 468A and 468B is adjustable.

The table 420 includes an opening (not shown) that receives a fastener 470. The table opening is aligned with one of the plurality of fastener openings 466 in the support 412. The fastener 470 is inserted through the fastener opening 466 in the support 412 and through the opening in the table 420. The support 412 and table 420 can have any suitable configuration to facilitate connecting the table 420 to the support 412. The table can have a pair of forwardly extending projections having fastener openings therein, and the table can have recesses adjacent each of the plurality of fastener openings 466 configured to receive the projections. The table 420 is selectively connected to one of the plurality of fastener openings 466 to adjust a height of the table 420 relative to the support 412. The fastener is preferably a press pin that can be pressed into and out of the aligned openings in the table 420 and the support 412, although any suitable fastener can be used.

As shown in FIG. 9, an angle α between the hinge arm 468 and a horizontal line through the first end 468A of the hinge arm 468 is approximately zero degrees. The table opening is aligned with the lowermost fastener opening 466 in the support 412. The table 420 is disposed in a first position. A bottom surface 4201 of the table 420 is disposed a first distance D1 from a bottom surface 412H of the support.

As shown in FIG. 10, the angle α between the hinge arm 468 and the horizontal line through the first end 468A of the hinge arm 468 is approximately 22.5 degrees. The table 420 is disposed in a second position. The table opening is aligned with the middle fastener opening 466 in the support 412. The bottom surface 4201 of the table 420 is disposed a second distance D2 from a bottom surface 412H of the support. The second distance D2 is greater than the first distance D1.

As shown in FIG. 11, the angle α between the hinge arm 468 and a horizontal line through the first end 468A of the hinge arm 468 is approximately forty-five degrees. The table 420 is disposed in a third position. The table opening is aligned with the uppermost fastener opening 466 in the support 412. The bottom surface 4201 of the table 420 is disposed a third distance D3 from the bottom surface 412H of the support 412. The third distance D3 is greater than the first distance D1 and greater than the second distance D2.

The features disclosed in each of the exemplary embodiments can be combined with features of any of the other disclosed embodiments.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part." "section." "portion," "member" or "element" when used in the singular can have the dual meaning of a single part or a plurality of parts. Also as used herein to describe the above embodiment(s), the following directional terms "forward", "rearward", "above", "downward". "vertical", "horizontal", "below" and "transverse" as well as any other similar directional terms refer to those directions of a vehicle equipped with the baby changing table assembly. Accordingly, these terms, as utilized to describe the present invention should be interpreted relative to a vehicle equipped with the baby changing table assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A baby changing table assembly for a vehicle comprising:
   a support;
   a connecting member connected to the support, the connecting member being configured to extend substantially parallel to a floor of a passenger compartment of the vehicle;
   first and second brackets connected to the connecting member, the first bracket being configured to be connected to a first headrest of the vehicle and the second bracket being configured to be connected to a second headrest of the vehicle; and a table movably connected to the support, the table being movable between a closed position and an open position, first and second notches being disposed in the table, the first and second notches being configured to be received by the first and second brackets, respectively, when the table is in the closed position.

2. The baby changing table assembly according to claim 1, wherein
the first and second brackets are movably connected to the connecting member to adjust a position of the first and second brackets along the connecting member.

3. The baby changing table assembly according to claim 1, wherein
the support is disposed between the first and second brackets.

4. The baby changing table assembly according to claim 1, wherein
a storage compartment is disposed in the support.

5. A baby changing table assembly for a vehicle comprising:
a support;
a connecting member connected to the support, the connecting member being configured to extend substantially parallel to a floor of a passenger compartment of the vehicle;
first and second brackets connected to the connecting member, the first bracket being configured to be connected to a first headrest of the vehicle and the second bracket being configured to be connected to a second headrest of the vehicle;
a table movably connected to the support, the table being movable between a closed position and an open position; and
a first arm movably disposed on a first side of the support and a second arm movably disposed on a second side of the support, the first and second arms being configured to engage front seats of the vehicle to support the table.

6. The baby changing table assembly according to claim 1, wherein
a tab is disposed on one of the support and the table, and a corresponding notch is disposed on the other of the support and the table, the notch receiving the tab when the table is in the closed position.

7. The baby changing table assembly according to claim 1, wherein
a first distance between the connecting member and an uppermost end of the support is less than a second distance between the connecting member and a lowermost end of the support, the first and second distances being perpendicular to the connecting member.

8. The baby changing table assembly according to claim 1, wherein
a plurality of fastener openings are disposed in the support, the table being selectively connected to one of the plurality of fastener openings to adjust a height of the table relative to the support.

9. The baby changing table assembly according to claim 8, wherein
a hinge arm extends between the table and the support to support the table.

10. A baby changing table assembly for a vehicle comprising:
a first seat;
a first headrest connected to the first seat;
a second seat disposed adjacent the first seat;
a second headrest connected to the second seat;
a support;
a connecting member connected to the support, the connecting member being configured to extend substantially parallel to a floor of a passenger compartment of the vehicle;
first and second brackets connected to the connecting member, the first bracket being configured to be connected to the first headrest and the second bracket being configured to be connected to the second headrest, the support being disposed between the first and second headrests in a lateral direction of the vehicle; and
a table movably connected to the support, the table being movable between a closed position and an open positions,
first and second notches being disposed in the table, the first and second notches being configured to be received by the first and second brackets, respectively, when the table is in the closed position.

11. The baby changing table assembly according to claim 10, wherein
the first and second brackets are movably connected to the connecting member to adjust a position of the first and second brackets along the connecting member to accommodate a distance between the first and second headrests.

12. The baby changing table assembly according to claim 10, wherein
an uppermost end of the support is disposed lower than an uppermost end of each of the first and second headrests.

13. The baby changing table assembly according to claim 10, wherein
a storage compartment is disposed in the support.

14. The baby changing table assembly according to claim 10, wherein
a first arm is movably disposed on a first side of the support and a second arm is movably disposed on a second side of the support, the first and second arms being configured to engage the first seat and the second seat, respectively, to support the table.

15. The baby changing table assembly according to claim 10, wherein
a tab is disposed on one of the support and the table, and a corresponding notch is disposed on the other of the support and the table, the notch receiving the tab when the table is in the closed position.

16. The baby changing table assembly according to claim 10, wherein
a first distance between the connecting member and an uppermost end of the support is less than a second distance between the connecting member and a lowermost end of the support, the first and second distances being perpendicular to the connecting member.

17. The baby changing table assembly according to claim 10, wherein
a plurality of fastener openings are disposed in the support, the table being selectively connected to one of the plurality of fastener openings to adjust a height of the table relative to the support.

18. The baby changing table assembly according to claim 17, wherein
a hinge arm extends between the table and the support to support the table.

* * * * *